Dec. 29, 1942. R. C. GRASEBY 2,306,542
PREPAYMENT METER MECHANISM
Filed Jan. 20, 1939 3 Sheets-Sheet 1
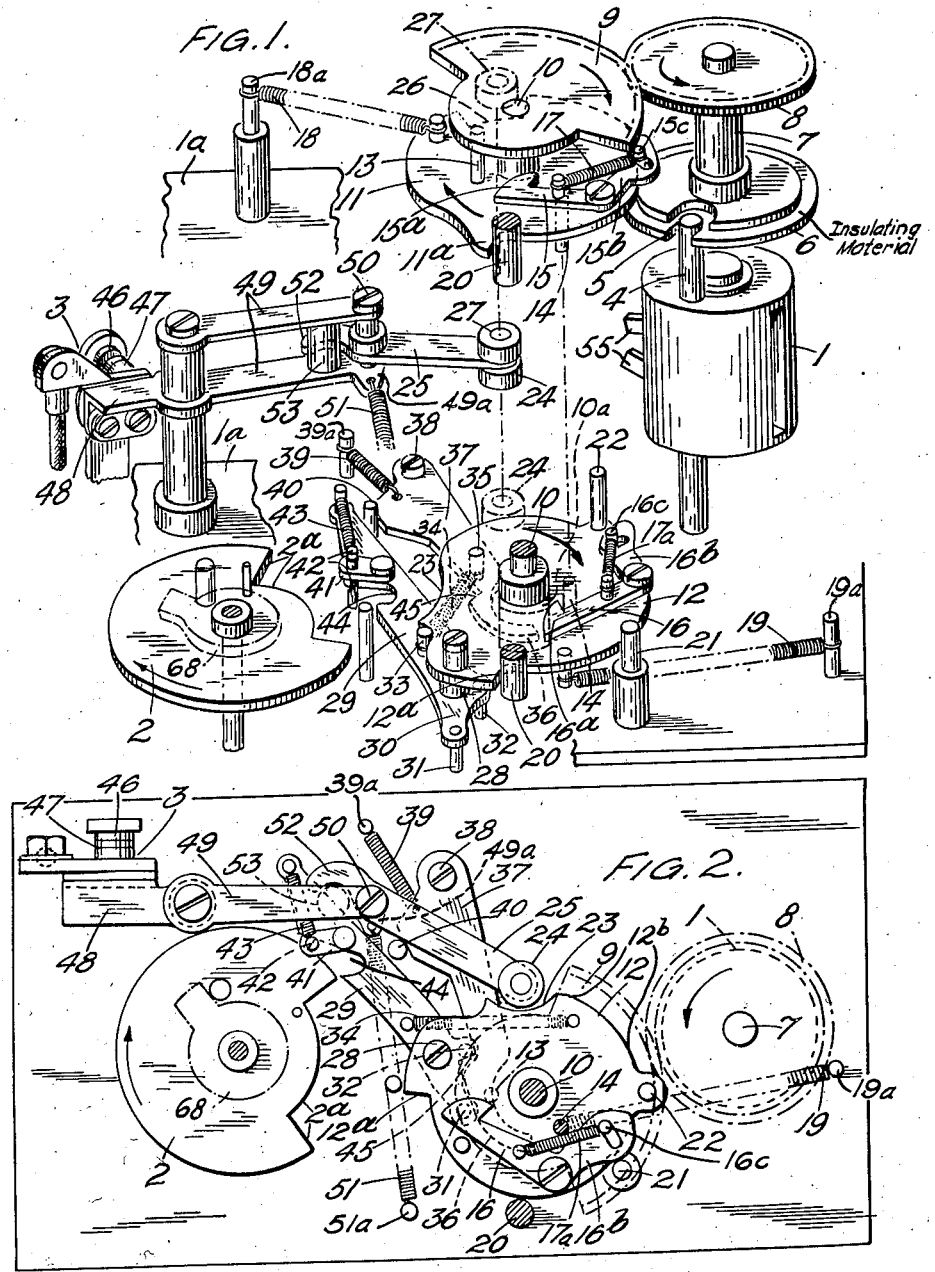

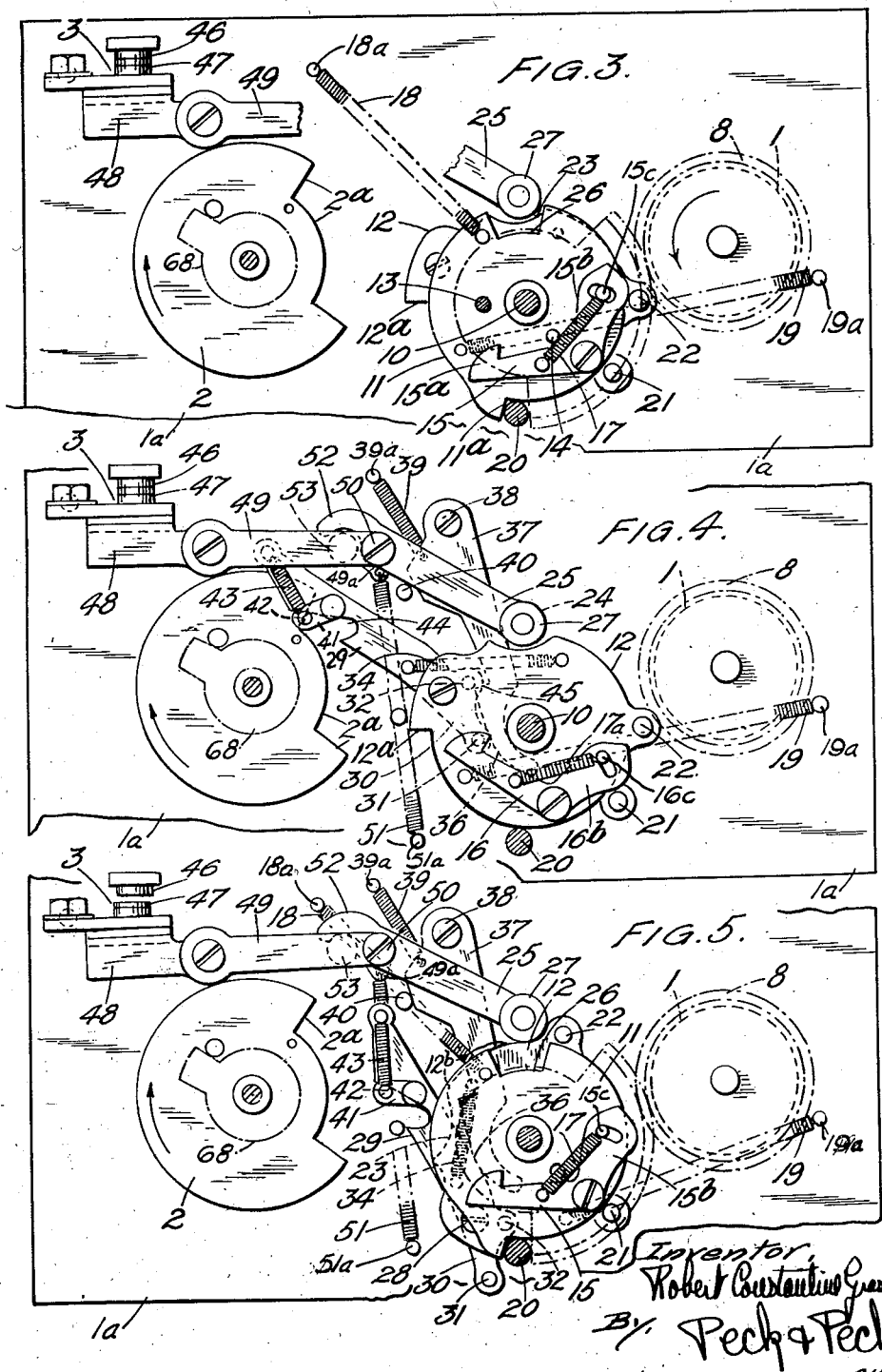

Dec. 29, 1942.   R. C. GRASEBY   2,306,542
PREPAYMENT METER MECHANISM
Filed Jan. 20, 1939   3 Sheets-Sheet 3
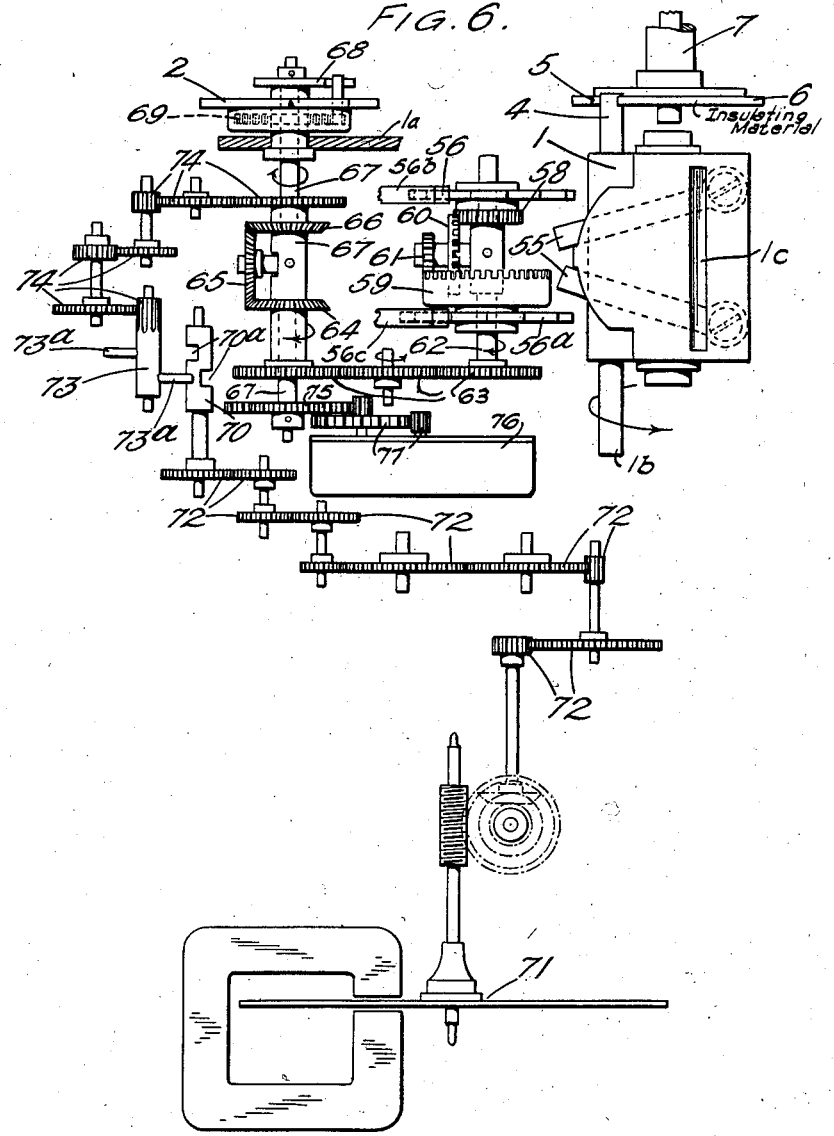

Patented Dec. 29, 1942

2,306,542

UNITED STATES PATENT OFFICE 2,306,542

PREPAYMENT METER MECHANISM

Robert Constantine Graseby, New Malden, England, assignor to Venner Time Switches Limited, New Malden, England, a company of Great Britain Application January 20, 1939, Serial No. 252,014
In Great Britain February 4, 1938

4 Claims. (Cl. 194—11)

This invention relates to prepayment meter mechanism which is particularly, though not exclusively, applicable for controlling the supply of electrical energy and is of the well-known kind (hereinafter referred to as the kind specified) comprising supply-controlling means (such as an electric switch), coin-barrel mechanism adapted both to advance quantity or setting mechanism after the insertion of a coin and also to cause the operation of the supply-controlling means (under the control of the said quantity or setting mechanism) to a supply-establishing position, and motor mechanism to return the quantity or setting mechanism to cause the supply-controlling means to cut off the supply when the quantity has been supplied for which payment has been made, such payment including, if desired, a part of a predetermined charge, such as a rental or "standing" charge.

In this specification and the claims appended hereto, the term "supply-controlling means" refers to the electric switch, gas valve or the like means normally provided in prepayment meter mechanism of the kind specified and which is exemplified in the embodiment of the invention described by the electric switch mechanism 3. Similarly, the term "setting mechanism" refers to the quantity cam means which is advanced proportionally to the value of the coins inserted in the meter and is returned proportionally to the quantity of the commodity which is being consumed, it serving to cause the supply-controlling means to interrupt the supply when the credit available is exhausted. The setting mechanism is exemplified herein by the cam 2. In the embodiment of the invention described herein the "retaining means" is constituted by the discs 11 and 12 and the "intermediate mechanism" is constituted by the sector 9 and the pins 13, 14 and catches 15, 16.

It is the object of the invention to provide improvements by which certain advantages shall be obtained, among them being a lighter loading on the motor mechanism; certainty of operation of the supply-controlling means irrespective of the value of coin inserted in the coin-barrel mechanism (which may be adapted to operate with two or more sizes or values of coin); positive operation of the supply-controlling means in the direction for cutting off the supply; no transmission of vibratory or kicking movements to the supply-controlling means due to operation of the coin-barrel mechanism either with a coin inserted and the supply established or without a coin inserted and with the supply interrupted; operation of the supply-controlling means to the supply-establishing position at or substantially at the instant that the inserted coin is released from the coin-barrel mechanism.

One feature of the invention is prepayment meter mechanism of the kind specified comprising means tending to actuate the supply-controlling means to the supply-establishing position, retaining means normally holding the supply-controlling means in the supply-interrupted position, an intermediate mechanism which is capable of establishing a drive from the coin-barrel mechanism to the retaining means while the supply-controlling means is in the supply-interrupted position and means rendered operative by a slight advance of the setting mechanism for causing the retaining means to become inoperative at a predetermined stage in the driving of the said retaining means by the coin-barrel mechanism so that the supply-controlling means will be actuated to the supply-establishing position.

Another feature of the invention is prepayment meter mechanism of the kind specified having means for holding the supply-controlling means in the supply-establishing position and further means co-operating with the setting mechanism to determine the instant at which the supply-controlling means shall be operated to the supply-interrupted position, wherein the force producing co-operation between the said further means and the setting mechanism is independent of the force by which the supply-controlling means is moved to and held in the supply-establishing position so that a very small force may be applied between the said further means and the setting mechanism and the loading on the motor mechanism correspondingly reduced.

The manner in which the invention is carried into practice will be clearly understood from the following description, given by way of example only, of a prepayment meter mechanism for controlling the supply of electrical energy, reference being made to the accompanying drawings which only illustrate those parts that are considered essential to the understanding of the invention.

In the drawings:

Fig. 1 is an exploded perspective view showing the mechanism (as seen from above) which is interposed between the coin-barrel and the switch, the latter being open, Fig. 2 is a rear elevation of the said mechanism with the switch closed, some parts being omitted or indicated in chain-dotted lines for the sake of clearness, Fig. 3 is a view similar to Fig. 2 but with some other parts omitted and certain elements of the mechanism in different positions, Fig. 4 is a further view similar to Fig. 2 with the parts in different positions, Fig. 5 is a similar view showing the switch in the open position, and Fig. 6 is a diagrammatic view showing the connections between the setting mechanism and the coin-barrel and motor mechanisms, respectively.

In the example the coin-receiver or coin-barrel 1 (Figs. 1 and 6) is adapted to receive coins of two different values and is constructed as described in British Specification No. 455,620, the means (indicated diagrammatically in Fig. 6) for transmitting a movement proportional to the value of the inserted coin from the coin-barrel 1 to the setting mechanism or quantity cam 2 being substantially as described in that specification. The coin-barrel 1 is adapted to be rotated by hand from the exterior of the meter by means of a handle or knob (not shown) which engages a pin 1b on the coin-barrel. In the latter are pivotally mounted two elements 55 which traverse a coin-slot 1c so that the insertion of a coin thereinto will cause them to be spread apart at their free ends. If the coin is of a high value the one element 55 is brought to a position in which it engages a tooth on a toothed wheel 56a but if the coin is of a low value the other element 55 is brought to a position in which it engages a tooth on a toothed wheel 56. The toothed wheel 56a is secured to one sun wheel 59 of a differential gear and the other toothed wheel 56 is secured to the other sun wheel 58 of the same differential gear. The latter comprises two planetary pinions 60 and 61 mounted coaxially on a stub shaft carried by a spindle 62 passing axially through the sun wheels 58 and 59, the pinion 60 meshing with the sun wheel 58 and the pinion 61 meshing with the sun wheel 59. The toothed wheel 56 is engaged by a spring-blade detent 56b and the toothed wheel 56a is engaged by a spring blade detent 56c. The gear ratios of the sun wheels and pinions are such that a predetermined rotation of the one sun wheel 59 while the other sun wheel 58 is held stationary by its detent will cause a rotation of the spindle 62 which is greater than the rotation imparted to the said spindle 62 when the said other sun wheel 58 is given the same predetermined rotation and the sun wheel 59 is held stationary by its detent, the relation between the rotations imparted to the spindle 62 being the same as the relation between the values of the high and low value coins referred to above. The spindle 62 is connected by gearing 63 to a sun wheel 64 of a second differential gear 64, 65, 66 having a planet-carrying spindle 67 on which is secured a driving element 68 for rotating the disc 2 constituting the setting or quantity cam. The disc 2 as it is advanced tensions a coiled watch-spring 69 which subsequently returns the disc 2 under the control of a rotary element 70 which is driven from the meter motor mechanism 71 through gearing 72. The rotary element 70 has flats or grooves 70a co-operating, during the rotation of the element, with radial pins 73a on a flier 73 driven from the sun wheel 66 of the second differential gear through gearing 74, the sun wheel 66 being operated due to the rotation of the planet-carrying spindle 67 with its pinion 65 while the sun wheel 64 is held stationary by the gearing 63 and wheels 56, 56a. When a "standing charge" is also to be collected an independent supplementary drive is provided in the form of a continuously running synchronous electric motor 76 which drives, through gearing 77, a gear wheel 75 secured on the spindle 67 in the direction for returning the disc 2.

Upon the insertion of a coin into the coin barrel 1, the one or other of the elements 55 is brought to its position for engaging a tooth of the respective toothed wheel 56 or 56a and upon rotation of the barrel 1 by hand, the disc 2 is advanced by an amount proportional to the value of the coin used, through the intermediary of the differential gear 58, 59, 60, 61 and the gearing 63 and driving element 68. As the commodity being supplied through the meter is consumed, the disc 2 is allowed to return, under the action of the spring 69, due to the rotation of the rotary element 70 by the meter motor mechanism 71.

The general arrangement of mechanism so far described is, however, common practice and forms no part of the present invention save as hereinafter pointed out. The means for returning the disc 2, for example, has already been described in British Specification No. 294,739.

The present invention is concerned with the mechanism to be interposed between the coin-barrel 1 and the switch (indicated generally at 3 in Fig. 1) for establishing the supply through the meter and such mechanism will now be described in detail.

A pin or the like 4 normally provided on the coin barrel 1 to rotate therewith (when the barrel is operated by hand as described above) and constituting the primary driving element in the switch-operating mechanism is engaged in a notch 5 in the periphery of an insulating disc 6 secured on an auxiliary spindle 7 aligned with the axis of the coin barrel 1. On this spindle is also secured a gear wheel 8 constantly in mesh with a toothed sector 9 secured on a spindle 10 disposed parallel with the spindle 7. The spindle 10 has freely mounted thereon, independently of each other, two disc-like members 11 and 12 of which that (11) located nearer to the toothed sector 9 will be referred to as the "first disc" and the other (12) as the "second disc." The first and second discs together constitute retaining means normally holding the switch 3 in the "off" position, as will be described hereinafter, the normal position of the discs 11 and 12 in which the switch is held in the "off" position being that shown in Figs. 1 and 5.

On that face of the toothed sector 9 which is adjacent to the first disc 11 is secured a driving pin 13 which terminates in close proximity to the latter and on that face of the first disc 11 which is adjacent to the second disc 12 is secured a similar driving pin 14 terminating just short of the second disc. The sector 9 and discs 11, 12 are spaced apart by suitable bosses or the like as will be understood. Mounted on that face of the first disc 11 which is adjacent to the sector 9 is a pivoted catch 15 in the form of a bell-crank lever having one arm formed with a hook 15a adapted to be engaged by the respective driving pin 13. The other arm 15b of the bell-crank lever has a pin-and-slot connection with the disc 11 and is normally held by a light spring 17 in an extreme or end position in which the hooked arm may engage the driving pin. The spring 17 is connected at one end to the said hooked arm and at the other end to a pin 15c on the disc 11 forming part of the said pin-and-slot connection. While in this end position the said other arm 15b (referred to herein as the "tail of the catch") projects beyond the edge of the disc 11 so that, upon rotation of the latter, it may strike a stop pillar 20 (mounted on a frame plate 1a part of which is shown in Figs. 1 and 6) and be deflected sufficiently to disengage its hooked end from the driving pin 13. Mounted on that face of the second disc 12 which is adjacent to the first disc 11 is a pivoted catch 16 also in the form of a bell-crank lever having one arm formed with a hook 16a adapted to be engaged by the driving pin 14 on the first disc 11. The other arm 16b of the bell-crank lever has a pin-and-slot connection with the disc 12 and is normally held by a second light spring 17a in an extreme or end position in which the hooked arm may engage the driving pin 14. The spring 17a is connected at one end to the said hooked arm and at the other end to a pin 16c on the disc 12 forming part of the said pin-and-slot connection. While in this end position the said other arm 16b (referred to herein as the "tail of the catch") projects beyond the edge of the disc 12 so that, upon rotation of the latter, it may strike a fixed stop 21 mounted on the frame plate 1a and be deflected sufficiently to disengage its hooked end from the driving pin 14.

The disc 11 (see Fig. 1) is constantly urged by spring means 18 connected to a pin 18a on the frame plate 1a in a direction (referred to as the "rearward direction") opposite to that in which the toothed sector 9 is rotated (indicated by the arrow applied thereto in Fig. 1) when the coin-barrel 1 is turned by hand in the direction for operating the switch-mechanism. Similarly, the disc 12 is constantly urged in the said rearward direction by spring means 19 connected to a pin 19a on the frame plate 1a. The driving pins 13 and 14 and pivoted catches 15 and 16 provided on the sector 9 and discs 11 and 12 are so disposed that a drive can be transmitted from the sector 9 to the first disc 11 and from the latter to the second disc 12 only in the "forward" direction, indicated by the arrows applied to the discs in Fig. 1, thus stressing the spring means 18 and 19 which normally hold the discs 11 and 12 in their initial positions (shown in Fig. 1) with both an abutment 11a formed on the disc 11 and an abutment 12a formed on the disc 12 hard against the stop pillar 20. In these positions of the discs the tail 16b of the catch 16 on the second disc 12 is spaced somewhat from the fixed stop 21 which is secured to the frame plate 1a so as to extend into the path of movement of the said tail and is located in advance of the latter considered in the sense of the forward movement of the second disc. The tail 15b of the catch 15 on the first disc 11 is, at this time, disposed at a location somewhat in advance of the tail 16b of the other catch 16 and the stop with which it is adapted to co-operate upon forward movement of the first disc is constituted by the common stop pillar 20 referred to above.

The second disc 12 also carried at its edge a pin 22 which extends into the path described by the tail 15b of the catch 15 on the first disc 11 during the rearward or return movement of the latter towards its initial position and constitutes a movable stop with which the said tail co-operates, in certain circumstances, during such rearward movement of the first disc. This movable stop 22 is located rearwardly of the tail 16b of the catch 16 on the second disc 12 at such a position that, when the latter is arrested during its forward movement by means to be described, the movable stop 22 is occupying the space normally occupied by the tail 15b of the catch 15 on the first disc 11 when this is in its initial position. At the same time the tail 16b of the catch 16 on the second disc 12 is located in contact with but not yet deflected by the fixed stop 21 on the frame plate 1a. The parts are shown with the disc 12 in the said arrested position, but with the disc 11 omitted, in Fig. 2.

The second disc 12 is formed with a notch or recess 23 extending inwardly from its periphery at such a location that, when the disc 12 is in the arrested position of Fig. 2, the notch 23 is located oposite to a roller 24 carried by a lever 25 pivoted at 50 on a part of the switch 3. The leading edge of the notch 23 merges into an eccentric portion 12b of the periphery of the disc 12. Similarly, the first disc 11 is formed with a notch 26 which is out of register with the notch 23 in the second disc when the two discs are in their initial positions (Figs. 1 and 5) but is, however, so located that it is opposite to a second roller 27 carried on the lever 25 coaxially with the roller 24 when the disc 11 is in its initial position.

Carried on a pivot 28 projecting from that surface of the second disc 12 which is remote from the first disc 11 is a lever 29, 30 having a long arm 29 and a short arm 30. The short arm carries, at its extremity, a pin 31 projecting away from the second disc 12, and, adjacent to the pivot 28, a further pin 32 also directed away from the said disc. The long arm 29 of the lever carries, adjacent to the pivot 28, a pin 33 projecting in the direction of the second disc 12 and connected by a tension spring 34 to a pin 35 carried on the second disc 12 in advance (considered in the forward direction of motion) of the pivot 28 for the lever 29, 30. The pin 32 on the short arm 30 of the lever is intended to co-operate with a cam face 36 formed on the free end of a further lever 37 located between the pin 32 and a boss or sleeve 10a (Fig. 1) rotatable on the spindle 10, carrying the first and second discs 11 and 12. The other end of the lever 37 is pivoted at 38 on the frame plate 1a of the mechanism and a spring 39 connected to a pin 39a on the said frame plate urges the free end of the lever towards the pin 32, a stop 40 being provided on the frame plate 1a which arrests the lever when the pin 32 is clear of its free end, as occurs with the second disc 12 in the initial position. This stop 40 is also engaged by the free end of the long arm 29 of the lever 29, 30.

The long arm 29 also carries towards its free end a very short pivoted arm 41 directed towards the setting mechanism 2 and carrying at its free end a pin 42 of half-round section at its operative end which is of sufficient length to engage the setting mechanism 2 when brought towards the latter. The short pivoted arm 41 is urged, by a spring 43 carried on the long lever arm 29, towards the free end of the latter but may, in certain circumstances mentioned below, move away from said end to cause the pin 42 carried thereon to enter a notch 44 formed in the said lever arm.

When the second disc 12 is rotated forwardly from the initial position, the lever 29, 30 pivoted thereon carries out a complex movement as follows: It moves bodily, due to the displacement of its pivot 28, about the axis of rotation of the disc, the said pivot first moving towards the setting mechanism 2 and then away from the latter; during the first part of this movement, due to the free end of its long arm 29 being supported by the stop 40, it is rocked relatively to the second disc 12 to cause the pin 32 on its short arm 30 adjacent to its pivot 28 to contact with the cam face 36 of the lever 37 and during the remainder of its movement the lever 29, 30 continues to rock in the same direction (the long arm 29 still moving towards the setting mechanism 2) but under the joint control of the stop 40 and the co-operation of the pin 32 and cam face 36.

In the cam face 36 on the lever 37 there is formed a step 45, positioned away from the pin 32, and at such a location that the pin 32 will come to the edge of the step just before the tail 16b of the catch 16 on the second disc 12 contacts with the fixed stop 21 on the frame plate 1a (see Fig. 2). During the rocking of the lever 29, 30 the pin 32 engaging the cam face 36 has displaced the lever 37 carrying the latter towards the adjacent boss or sleeve (not shown) and as the pin 32 moves over the edge of the step 45 in the cam face the said lever 37 is returned by its spring 39 to engage the step 45 behind the pin 32 in catch-fashion. The further displacement of the pivot 28 for the lever 29, 30 on the second disc 12 is carried out in such a direction relatively to the stop 40, engaging the said lever, that the free end of the arm 29 of the latter is forced to swing towards the setting mechanism 2 to move the pin 42 carried by the short arm 41 pivoted on the lever substantially radially of the said setting mechanism (this will be described below). During the swinging movement, the arm 29 remains in contact with the stop 40 and the spring 34 is extended. This swinging movement brings the pin 31 at the extremity of the short arm 30 of the pivoted lever 29, 30 close to the cam face 36 on the lever 37 so that a subsequently produced movement of the lever 29, 30 in the same direction would swing this pin 31 towards the spindle 10 carrying the discs, and thus force the cam face 36 away from the pin 32 then engaged in the step 45 in the said face. This subsequent movement is produced under the action of the spring 19, the pressure of which is applied to the lever 29, 30 at the pivot 28 as soon as the catch 16 is disengaged from the driving pin 14. This disengagement occurs during a slight forward movement of the disc 12 beyond the position corresponding to the engagement of the step 45 behind the pin 32, the said pin moving slightly away from the step in the direction of the pivot 38 for the lever 37 and the pin 42 approaching closely to but not touching the setting mechanism 2 during the said forward movement. This slight additional forward movement of the disc 12 brings the tail 16b of the catch 16 thereon against the fixed stop 21 and causes the deflection of the catch 16 to a position in which the disc 12 is disconnected from the disc 11. When this happens the spring 19 tending to return the disc 12 is free to cause rearward motion thereof. During the first part of this movement of the disc 12 the tail 16b of the catch 16 is disengaged from the fixed stop 21 so that the catch returns to its initial position again, although the driving pin 14 on the disc 11 has now passed the catch and can no longer drive the disc 12, and the pin 32 on the short arm 30 of the pivoted lever 29, 30 is returned on to the step 45 on the cam-face lever 37. The pressure of the spring 19 therefore forces the lever 29, 30 to rotate about its pivot 28, since the pin 32 is held by the step 45, in the direction for moving the pin 42 carried by the short pivoted arm 41 on the said lever against the setting mechanism 2. Should the setting mechanism 2 be in an advanced position, as is shown in Fig. 2, the pin 42 is arrested by striking the periphery thereof just as the pin 31 has engaged the cam face 36 on the lever 37 and has displaced it to a position in which the step 45 is on the point of being withdrawn from behind the pin 32 engaged therein. The spring 34 connected between the lever arm 29 and the disc 12 cannot rotate the former away from the setting mechanism 2 due to the engagement of the pin 32 on the lever arm 30 in the step 45 of the cam-face lever 37 and the disc 12 is therefore locked in the adjusted position.

If, in contradistinction to the above, the setting mechanism 2 be in a position, such as is shown in Fig. 1 or Fig. 4, in which it offers no resistance to the pin 42 carried by the arm 41 on the lever 29, 30, the latter will continue to swing in the direction of the setting mechanism 2 under the action of the spring 19. The pin 31 at the extremity of its short arm 30 will thereby be moved sufficiently to disengage the step 45 in the cam-face lever 37 from the pin 32 engaged therein (see Fig. 4), thus permitting the said spring 19 to return the disc 12 together with the lever 29, 30. At the moment of disengagement of the step 45 and pin 32, the spring 34 between the lever 29, 30 and the disc 12 also becomes operative to rock the lever 29, 30 away from the setting mechanism 2.

While the second disc 12 is held stationary and disengaged from the first disc 11, in the manner which has been described, the first disc continues its forward movement under the action of the drive imparted by the coin-barrel 1 which is being rotated by hand. After a short movement, however, the tail 15b of the catch 15 carried on the disc 11 is brought against the common stop pillar 20 and the catch 15 is thus disengaged to free the disc 11 from the driving pin 13 of the toothed sector 9. Its returning spring 18 then causes the disc 11 to fly back to the initial position but, as the disc 12 is now displaced, the tail 15b of the catch 15 on the disc 11 contacts with the movable stop 22 carried by the disc 12 and is held in the catch-disengaged position (see Fig. 3). The release of the first disc 11 is arranged to occur at the extreme end of the forward rotation of the coin-barrel 1 imparted by the hand operation thereof. In the present position of the parts, as indicated in Fig. 3, with the first disc 11 in the initial position and the second disc 12 in the displaced position, the notches 26 and 23 in the discs are in register and both opposite to the rollers 27 and 24 carried on the end of the lever 25 pivoted to the switch mechanism 3.

This mechanism comprises a fixed contact 46 and a movable contact 47 which is carried on the one end 48 of a two-armed pivoted lever 48, 49 having the lever 25 carrying the rollers 24, 27 pivoted at 50 on its other end 49. A tension spring 51, of greater strength than the spring 19 which applies the pin 42 to the disc 2, is connected between a lug 49a on the lever end 49 opposite to the joint 50 and a pin 51a on the frame plate 1a and tends to move the joint in the direction for closing the contacts 46, 47. Such movement is normally prevented due to the fact that the joint 50 is a knee-joint which breaks away from the spring 51 (the lever 25 having an extension 52 which co-operates with a stud 53 on the end 49 of the lever 48, 49) and that the rollers 24, 27 on the lever 25 are held in a position in which the switch is open by the bearing of one or both thereof upon concentric parts of the peripheries of the first and/or second discs (11 and/or 12) until the latter have been so positioned that the notches 23, 26 therein are in register. When such registering of the notches occurs, in the manner described above, the spring 51 immediately operates the switch lever 48, 49 to close the contacts 46, 47 and swing the rollers 24, 27 into the said notches 23, 26.

The setting mechanism 2 preferred, although others may be employed, comprises a flat circular disc having a notch 2a cut in its periphery with radially extending walls. The radial wall which leads during the return of the setting mechanism 2 to the switch-opening position is adapted to pass beyond the pin 42 carried by the short arm 41 on the pivoted lever 29, 30 on the second disc 12 just as this position is reached. When operative for retaining the second disc 12 in the displaced position, the said pin 42 bears on the peripheral edge of the disc of the setting mechanism.

From the constructional details given above it can be understood how the mechanism is adapted to operate and a short recapitulation of the main steps in the operation will suffice.

Let it be assumed that the switch is open, that no credit is registered by the disc 2 and no coin is inserted into the coin-barrel. The position of the various parts is then as shown in Fig. 5. Rotation of the coin barrel 1 by hand in the opposite direction to that represented by the arrow on the gear wheel 8 in Fig. 1 causes the driving pin 13 on the sector 9 to move behind the catch 15 on the first disc 11 and the rotation by hand of the barrel 1 forwardly then causes the sector 9 to drive the disc 11 (through the pin 13 and catch 15) a distance sufficient to cause the pin 14 on the disc 11 to engage the catch 16 on the second disc 12. Continued forward rotation of the barrel 1 causes the sector 9 and the pair of discs 11, 12 to rotate as one until the catch 16 has been disengaged from the driving pin 14 whereupon the pin 42 adapted to co-operate with the setting mechanism passes into the notch 2a in the disc 2. The second disc 12 then returns to its initial position under the action of its spring 19. Further forward movement of the first disc 11 causes this to become disengaged from the sector 9 by reason of the catch 15 being disengaged from the driving pin 13 and also to return to its initial position under the action of its spring 18. At no time during these operations can the switch be moved to the closed position since there is always a concentric part of one of the discs 11, 12 (at least) in engagement with one of the rollers 24, 27 on the lever 25 which is connected to the switch lever 48, 49.

Let it now be assumed that the setting mechanism constituted by the disc 2 is advanced (by the driving element 68 as described with reference to Fig. 6) a fractional part of its full movement, equivalent say to the insertion of a penny in the coin-barrel 1 and the rotation thereof by hand, it being understood that the advance of the setting mechanism occurs before the pin 42 on the pivoted lever 29, 30 has reached a position in which it could contact the periphery of the flat circular disc 2. The advance of the setting mechanism or quantity cam 2 is effected, as before described with reference to Fig. 6, through the intermediary of the one or other of the elements 55, toothed wheel 56 or 56a, differential gear 58—61, differential gear 64—66 and driving element 68.

In this case the sector 9 and the two discs 11, 12 rotate as one until the catch 16 is disengaged from the driving pin 14 and the pin 42 on the pivoted lever 29, 30 is caused to strike the periphery of the disc 2. Sufficient purchase is obtained by the pin 42 even if the disc 2 be only shifted peripherally a few thousandths of an inch, since the sharp edge of the pin (the operative end of it is of half-round section as clearly indicated in Figs. 2, 4 and 5) strikes the said periphery while moving radially in relation to the disc. When the pin 42 engages the periphery of the disc 2, the second disc 12, which is then disconnected from the first disc 11, is held stationary, by the engagement of the step 45 on the lever 37 behind the pin 32 on the lever 29, 30, with its notch 23 opposite the roller 24 on the lever 25. Further rotation of the coin-barrel 1 by hand causes the first disc 11 to become disconnected from the sector 9 and thus to return to its initial position in which its notch 26 is opposite the roller 27. Consequently the switch 46, 47 is closed by the action of the spring means 51. The position of the parts is then as shown in Fig. 2.

Should a further coin be inserted and the coin-barrel 1 be again rotated by hand, all that happens is the resultant advancing of the disc 2 since the catch 15 on the first disc 11 is held in the disengaged position due to the tail 15b of the catch being in engagement with the movable stop 22 carried on the second disc 12 (see Fig. 3) and the driving pin 13 on the sector 9 cannot therefore impart motion to the first disc 11 (see Fig. 3). Rotation of the barrel 1 by hand without a coin inserted has the same result except that the setting mechanism constituted by the disc 2 is not then advanced.

When the disc 2 has been returned under the control of the meter motor mechanism as described with reference to Fig. 6 (the parts being in their positions shown in Fig. 2 during the return) the pin 42 bearing on the periphery of the disc 2 under the action of the spring 19 slips into the notch 2a in the disc (as shown in Fig. 4). The pin 31 at the extremity of the short arm 30 of the lever 29, 30 is thereby moved sufficeintly to disengaged the step 45 in the cam-face lever 37 from the pin 32 engaged therein, thus permitting the spring 19 to return the disc 12 to its initial position (see Fig. 5). During the last part of the movement of the disc 12 the eccentric portion 12b (Fig. 2) of its periphery urges the corresponding roller 24 outwards to cause the lever 25 to rock the two-armed lever 48, 49 in the direction for positively separating the switch contact 47 from the fixed contact 46.

Reference has been made above to the mounting of the pin 42 so that it may move away from the free end of the long lever arm 29. This is to provide for the case where the disc 2 has been returned extremely slowly (as by operation of the continuously running synchronous electric motor only) to the position in which the pin 42 is just on the point of entering the notch 2a in the disc 2 and a coin is then inserted and the coin-barrel rotated by hand. This would cause rotation of the disc 2 in the direction indicated by the arrow thereon in Fig. 1 and if the pin 42 were entered into the path of the periphery of the disc 2 there would be a tendency to shear the pin were this rigidly mounted on the arm 29. Owing to its yeldable mounting, however, it would move into the notch 44 in the arm 29 and become disposed outside the said path, then returning under the action of its spring 43 to its normal position. Straining of the mechanism is thereby avoided.

What I claim is:

1. Prepayment meter mechanism comprising coin-barrel mechanism, quantity or setting mechanism adapted to be actuated to a credit position upon actuation of the coin-barrel mechanism after the insertion of a coin therein, supply-controlling means, means tending to actuate the supply-controlling means to a supply-establishing position, retaining means composed of first and second elements each capable of holding the supply-controlling means in a supply-interrupted position except when disposed in a predetermined position, returning means tending to hold the first element in an initial position which is also its predetermined position, further returning means tending to hold the second element in an initial position which is other than its predetermined position, means capable of establishing a drive from the coin-barrel mechanism to the first element provided that the latter be in its initial position, means capable of establishing a drive from the first element to the second element upon the setting in motion of the said first element, means for rendering the second-mentioned drive-establishing means inoperative when the second element is passing through its predetermined position, a retaining device mounted independently of both the retaining means and the quantity or setting mechanism, means carried by the second element and adapted to co-operate with both the said retaining device and a portion of the quantity or setting mechanism which is only operative to engage the said means when the said mechanism is in a credit position, the engagement of the said means at one and the same time with both the retaining device and the said portion preventing the second element from moving to its initial position under the action of its returning means after the rendering of the second-mentioned drive-establishing means inoperative, means for rendering the first-mentioned drive-establishing means inoperative after further travel of the first element so that its returning means moves the said element to its initial or predetermined position, whereupon the supply-controlling means is operated to the supply-establishing position, and motor mechanism for returning the quantity or setting mechanism from its credit position so that the said portion thereof will move out of engagement with the means carried by the second element and permit the latter to be restored to its initial position by its returning means and therefore cause the supply-controlling means to be actuated to the supply-interrupted position.

2. Prepayment meter mechanism as claimed in claim 1, wherein the means capable of establishing a drive from the coin-barrel mechanism to the first element includes a driving member operated by the coin-barrel mechanism and disengageable means carried by the first element which normally engages the said driving member, and including means carried by the second element at such a location that it co-operates with the said disengageable means to hold the same in the disengaged position so long as the first and second elements are disposed in their predetermined positions.

3. Prepayment meter mechanism as claimed in claim 1, wherein the means carried by the second element and co-operating with both the retaining device and the quantity or setting mechanism is a pivoted two-armed lever with unequal arms of which the shorter co-operates with the retaining device and the longer co-operates with the quantity or setting mechanism, and wherein the returning means tending to hold the second element in its initial position is a spring the full pressure of which is applied at the pivot for the two-armed lever so that were the shorter arm thereof engaged with the retaining device any engagement between the longer arm of the said lever and the quantity or setting mechanism would be effected with a pressure less than the said full pressure, the movement of the quantity or setting mechanism out of engagement with the said longer arm of the two-armed lever permitting the return of the second element to its initial position under the action of the full pressure of the spring.

4. Prepayment meter mechanism comprising coin-barrel mechanism, supply-controlling means, means tending to actuate the supply-controlling means to a supply-establishing position, retaining means initially disposed to hold the supply-controlling means in a supply-interrupted position but capable of being driven to an inoperative position in which the supply-controlling means is free to move to the supply-establishing position, means capable of establishing a drive from the coin-barrel mechanism to the retaining means while the latter is in its initial position, means tending to return the retaining means to its initial position, a retaining device, means carried by the retaining means and moved thereby, upon the driving of the said retaining means, into engagement with the retaining device, said engagement if maintained causing the retaining means to be held in its inoperative position, quantity or setting mechanism initially disposed in a position in which the means carried by the retaining means cannot cooperate therewith, means operated by actuation of the coin-barrel mechanism after the insertion of a coin therein for advancing the quantity or setting mechanism to a credit position in which the said means carried by the retaining means will cooperate therewith to be maintained in engagement with the retaining device, and motor mechanism for returning the quantity or setting mechanism from its credit position so that the means carried by the retaining means will no longer be maintained in engagement with the retaining device when the quantity has been supplied for which payment has been made and the retaining means will be returned to its initial position to cause the supply-controlling means to assume its supply interrupted position.

ROBERT CONSTANTINE GRASEBY.